July 3, 1951     A. E. RUTTER     2,559,517
DISK PLOW

Original Filed Sept. 30, 1943     3 Sheets—Sheet 1

Inventor
Alvah E Rutter
By Emerson B Donnell
Attorney

July 3, 1951  A. E. RUTTER  2,559,517
DISK PLOW

Original Filed Sept. 30, 1943  3 Sheets-Sheet 3

Inventor
Alvah E Rutter
By Emerson B Donnell
Attorney

Patented July 3, 1951

2,559,517

UNITED STATES PATENT OFFICE 2,559,517

DISK PLOW

Alvah E. Rutter, Rockford, Ill., assignor to J. I. Case Company, Racine, Wis., a corporation Original application September 30, 1943, Serial No. 504,427. Divided and this application October 6, 1948, Serial No. 52,997

6 Claims. (Cl. 308—21)

This invention relates to disk plows of the type employing means for raising and lowering the disks relative to the ground, for the purpose of adjustment and transportation.

This application is a division of the co-pending application to Alvah E. Rutter, Serial No. 504,427, filed September 30, 1943, now Patent 2,454,482, issued November 23, 1948.

An object of this invention is to provide an improved rock shaft bearing of novel construction.

Further objects will become apparent from the following description and accompanying drawings in which a satisfactory embodiment of the invention is shown. However, it is to be understood that the invention is not limited to the details disclosed but includes all such variations and modifications as fall within the spirit of the invention as herein expressed.

Figure 1:
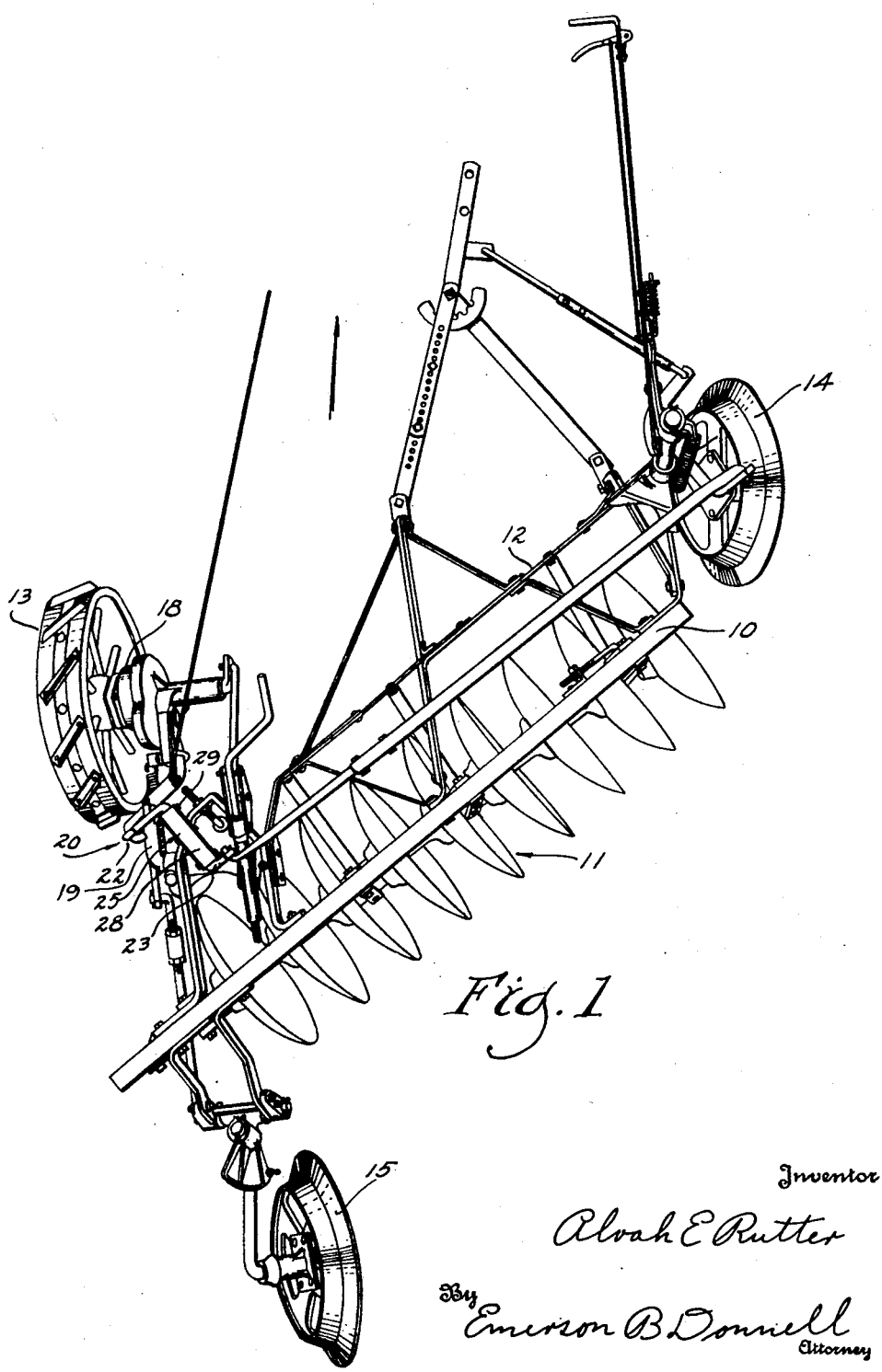
Fig. 1 shows a plan view of a plow embracing the invention.

Plows of this type usually comprise a frame 10 under which a disk gang 11 is journaled. A forwardly-projecting frame-work 12 is secured to frame 10 and supports land wheel 13, a front furrow or supporting wheel 14 and a rear furrow wheel 15. The gang 11 is journaled in a plurality of bearings 16, and brackets 17, only one of each being shown. Wheels 13, 14, and 15 are arranged to be adjusted so that the gang 11 may be raised or lowered. The means of doing this is clear from the drawings, is described in Rutter Patent No. 2,454,482, and will be further described only so as to make the present invention clear.

Figure 2:
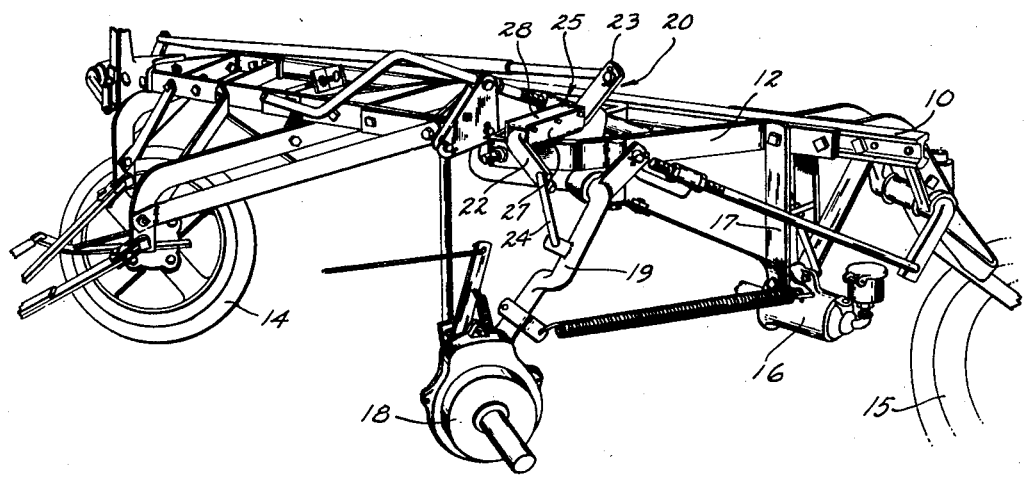
Fig. 2 shows a perspective view of the plow with parts removed.

Referring to Fig. 2, a cyclic clutch 18 is fixed on a crank arm 19, and which serves to raise and lower the frame 10 by means described in Patent No. 2,454,482 and which means is arranged to simultaneously act upon all wheels 13, 14, and 15 through proper rock shafts and links not necessary to describe here.

This invention comprises an intermediate rock shaft 20 supported horizontally over frame 12 (see Fig. 2). Rock shaft 20 is the central control member for raising and lowering the discs and comprises a horizontal bearing portion 21, a generally downwardly extending arm 22 and a generally upwardly extending arm 23. A link 24 connects crank arm 19 with arm 22.

Figure 3:
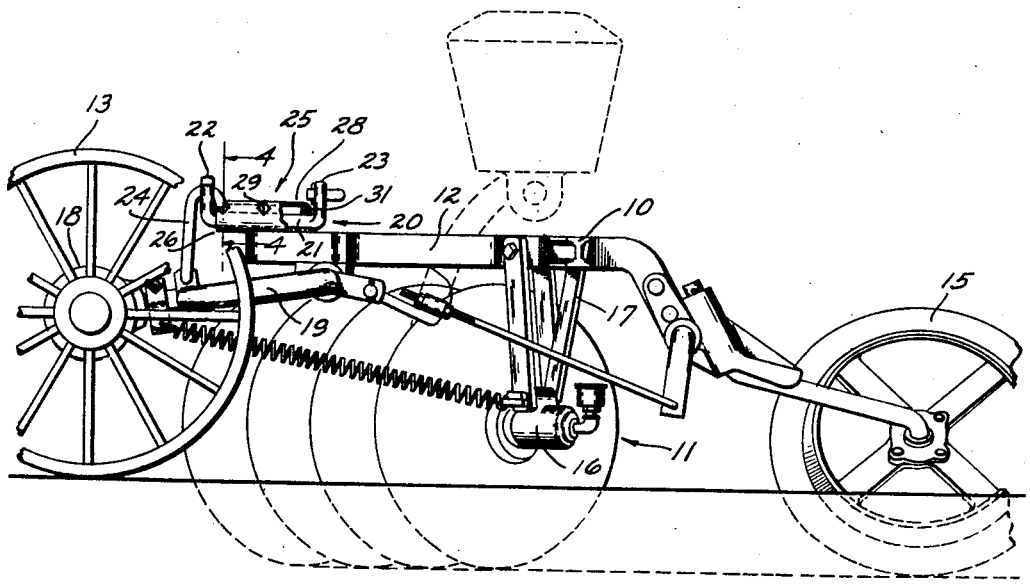
Fig. 3 shows a left side view of a plow in working position and with parts removed.
Figure 4:
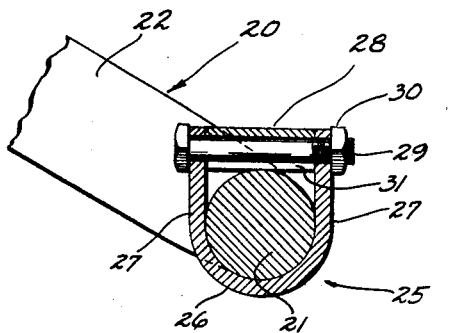
Fig. 4 shows a section at 4—4 of Fig. 3.

The rock shaft 20 is journaled in a bearing 25, the axis of the former extending normally to frame 10. Bearing 25 comprises a lower channel saddle member 26 formed semi-cylindrically as shown in Fig. 4 so as to provide a bearing surface for the lower portion of member 21. The force extended on the bearing surface is in a downward direction. Saddle member 26 is secured by welding, or any suitable method, to frame 12 as shown in Figs. 2 and 3. Saddle member 26 has upwardly extending sides 27 which terminate above the bearing portion 21 of rock shaft 20. A spacer and housing plate 28 fits intermediate the sides 27 and maintains the portion 21 of rock shaft 20 in contact with the seat of saddle member 26, the last mentioned seat forming the bearing proper. Bolts 29 pass through holes provided in sides 27, and nuts 30 serve to secure the plate 28 between the sides 27 confining the portion 21 in the saddle 26 but allowing the portion 21 freedom to rotate. Ends 31 of plate 28 are formed to provide a channel for bolts 29 as shown in Figs. 3 and 4.

This construction provides a convenient and economical saddle bearing for use in positions where the load is in one direction, and facilitates assembly and disassembly.

The above being a complete description of an illustrative embodiment of the invention, what is claimed as new and desired to be secured by Letters Patent of the United States is:

1. In a disk plow having a frame and a power lift, a rock shaft construction for the power lift comprising a horizontally-journaled rotatable rock shaft, a bearing for said rock shaft secured to said frame and comprising a saddle formed to provide a bearing surface for the lower half of said rock shaft, said bearing surface co-extensive with 180 degrees of the periphery of said rock shaft, said saddle having upwardly extending walls tangent to said rock shaft and extending above the latter, a housing plate intermediate said walls and arranged to confine said rock shaft substantially in contact with said bearing and a plurality of fastening members arranged to secure said walls in contact with the said housing plate, the latter making a line contact with said rock shaft at a point diametrically opposed to said bearing surface.

2. A journal bearing for a one-way load for use with a disk plow having a plurality of supporting wheels, a power lift and linkage leading from the power lift to one of said supporting wheels, said linkage including a rocking journal, the combination of a U-shaped channel element having a closed side constituting a saddle and embracing substantially one-half of the periphery of said journal and disposed in the direction of the force resulting from the one-way load and also having upwardly directed spaced walls tangent to said channel, spacer and cover means interposed between the walls and contacting said journal along a line on the periphery thereof and clamping means extending between the walls spaced from said closed side and adapted for urging said walls toward each other and clamping said cover means therebetween for predetermining the spacing of the walls and closing the opening to prevent inadvertent displacement of the journal therefrom.

3. In a disk plow having a plurality of supporting wheels, a power lift and linkage leading from the power lift to one of said supporting wheels and including a rocking journal disposed to be forced in a predetermined direction, laterally of said journal by the action of said linkage, a bearing for said journal which comprises a flexible saddle member supported on said plow and having a rounded closed portion adapted to fit one side of said journal and disposed in the direction in which said journal is forced, and an open portion disposed in the direction opposite to that in which said journal is forced, upstanding sides defining said open portion, and a substantially flat plate disposed between said upstanding sides and presenting its edges thereto so as to determine the spacing between said sides and the fit of said saddle about said journal, and said plate having channel portions extending transversely of said journal, and bolts extending through said upstanding sides and through said channels and forcing said sides into clamped relation against the edges of said plate.

4. In a disk plow having a plurality of supporting wheels, a power lift and linkage leading from the power lift to one of said supporting wheels and including a rocking journal disposed to be forced in a predetermined direction, laterally of said journal by the action of said linkage, a bearing for said journal which comprises a flexible saddle member supported on said plow and having a rounded closed portion adapted to fit one side of said journal and disposed in the direction in which said journal is forced and contacting substantially 180 degrees of the periphery of said journal, and an open portion disposed in the direction opposite to that in which said journal is forced, upstanding sides defining said open portion, and a substantially flat plate disposed between said upstanding sides and presenting its edges thereto so as to determine the spacing between said sides and the fit of said saddle about said journal, and said plate having channel portions extending transversely of said journal, and bolts extending through said upstanding sides and through said channels and forcing said sides into clamping relation against the edges of said plate.

5. In a disk plow having a plurality of supporting wheels, a power lift and linkage leading from the power lift to one of said supporting wheels and including a rocking journal disposed to be forced in a predetermined direction, laterally of said journal by the action of said linkage, a bearing for said journal which comprises a flexible saddle member supported on said plow and having a rounded closed portion adapted to fit one side of said journal and disposed in the direction in which said journal is forced, and an open portion disposed in the direction opposite to that in which said journal is forced, upstanding sides defining said open portion, and a substantially flat plate disposed intermediate said upstanding sides normal thereto and presenting a line contact with said journal, and bolts extending through said upstanding sides and forcing said sides into clamped relation against the edges of said plate.

6. In a disk plow having a plurality of supporting wheels, a power lift and linkage leading from the power lift to one of said supporting wheels and including a rocking journal disposed to be forced in a predetermined direction, laterally of said journal by the action of said linkage, a bearing for said journal which comprises a saddle member supported on said plow and having a rounded closed portion adapted to fit one side of said journal and disposed in the direction in which said journal is forced, and an open portion disposed in the direction opposite to that in which said journal is forced, upstanding sides defining said open portion, and a plate disposed between said upstanding sides and presenting its edges thereto, said plate being formed at its ends with channel portions extending transversely of said journal, and bolts extending through said upstanding sides and through said channel portions and forcing said sides into clamped relation against the edges of said plate.

ALVAH E. RUTTER.

REFERENCES CITED

The following references are of record in the file of this patent:

UNITED STATES PATENTS

| Number | Name | Date |
|---|---|---|
| 491,727 | Maloney | Feb. 14, 1893 |
| 1,885,955 | Silver | Nov. 1, 1932 |